(12) United States Patent
Hiroki

(10) Patent No.: US 9,344,586 B2
(45) Date of Patent: May 17, 2016

(54) COMMUNICATION APPARATUS, CONTROL METHOD, AND PROGRAM

(71) Applicant: CANON KABUSHIKI KAISHA, Tokyo (JP)

(72) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/374,852

(22) PCT Filed: Jan. 17, 2013

(86) PCT No.: PCT/JP2013/000198
§ 371 (c)(1),
(2) Date: Jul. 25, 2014

(87) PCT Pub. No.: WO2013/111538
PCT Pub. Date: Aug. 1, 2013

(65) Prior Publication Data
US 2014/0368675 A1 Dec. 18, 2014

(30) Foreign Application Priority Data

Jan. 27, 2012 (JP) .................... 2012-015601

(51) Int. Cl.
*H04N 1/00* (2006.01)
*H04W 48/18* (2009.01)
(Continued)

(52) U.S. Cl.
CPC ......... *H04N 1/00103* (2013.01); *H04B 5/0031* (2013.01); *H04N 1/00127* (2013.01);
(Continued)

(58) Field of Classification Search
CPC ..... H04W 36/36; H04W 36/38; H04W 88/06; H04W 36/00–36/385; H04W 52/00; H04N 1/00103–1/00108; H04B 5/0031
See application file for complete search history.

(56) References Cited

U.S. PATENT DOCUMENTS

2010/0311330 A1* 12/2010 Aibara et al. ................ 455/41.2
2011/0177780 A1* 7/2011 Sato et al. .................... 455/41.1
(Continued)

FOREIGN PATENT DOCUMENTS

JP 2004-007351 A 1/2004
JP 2009-055505 A 3/2009
(Continued)

OTHER PUBLICATIONS

International Search Report and Written Opinion for PCT/JP2013/000198, dated Mar. 12, 2013.

*Primary Examiner* — Paul Berardesca
(74) *Attorney, Agent, or Firm* — Canon USA, Inc. IP Division

(57) ABSTRACT

A communication apparatus includes a first communication unit configured to communicate in a bidirectional communication mode for performing bidirectional message communication with an apparatus at the other side and in another mode for accepting an access to a predetermined storage area from the apparatus at the other side, a control unit that has an active mode having a first power consumption and an inactive mode having a lower power consumption than the first power consumption, and a detection unit configured to detect that the control unit is in the inactive mode, wherein when the control unit is in the inactive mode, and the first communication unit performs the bidirectional communication mode with a communication partner, and a predetermined service is designated by the communication partner, the first communication unit communicates information according to the predetermined service designated by the communication partner while the control unit is in the inactive mode.

14 Claims, 6 Drawing Sheets

(51) Int. Cl.
*H04B 5/00* (2006.01)
*H04W 52/02* (2009.01)

(52) U.S. Cl.
CPC .......... *H04W48/18* (2013.01); *H04W 52/0229* (2013.01); *H04N 2201/0084* (2013.01); *Y02B 60/50* (2013.01)

(56) References Cited

U.S. PATENT DOCUMENTS

2011/0183614 A1* 7/2011 Tamura ........................ 455/41.2
2012/0069772 A1* 3/2012 Byrne et al. .................. 370/255
2012/0238205 A1* 9/2012 Reunamaki et al. ......... 455/41.1
2012/0309309 A1* 12/2012 Cho et al. ..................... 455/41.1
2013/0157566 A1* 6/2013 Oguchi ........................ 455/41.1

FOREIGN PATENT DOCUMENTS

| | | |
|---|---|---|
| JP | 2009-207069 A | 9/2009 |
| JP | 2010-245748 A | 10/2010 |
| JP | 2011-044092 A | 3/2011 |
| JP | 2011-182449 A | 9/2011 |

* cited by examiner

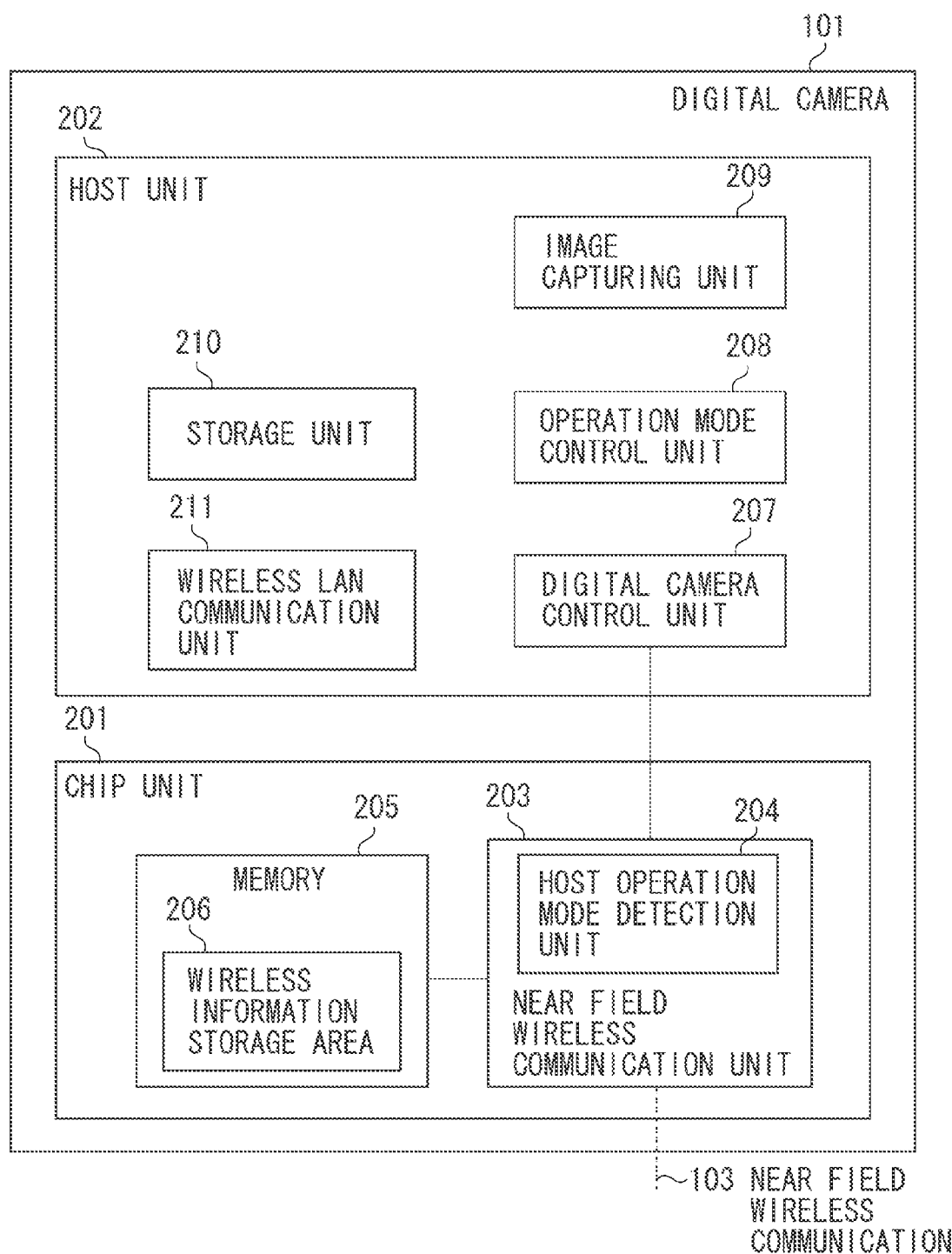

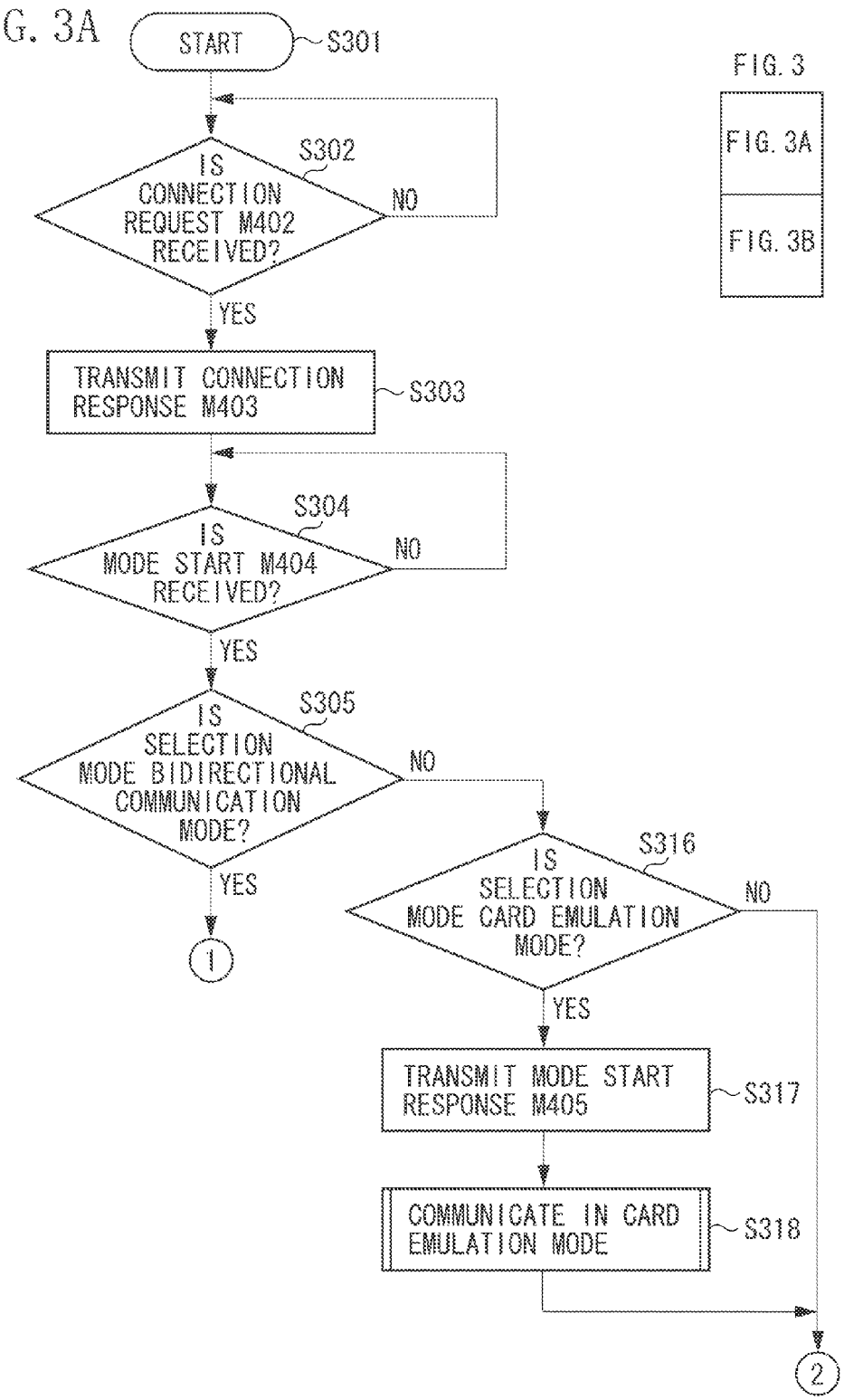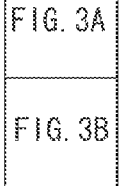

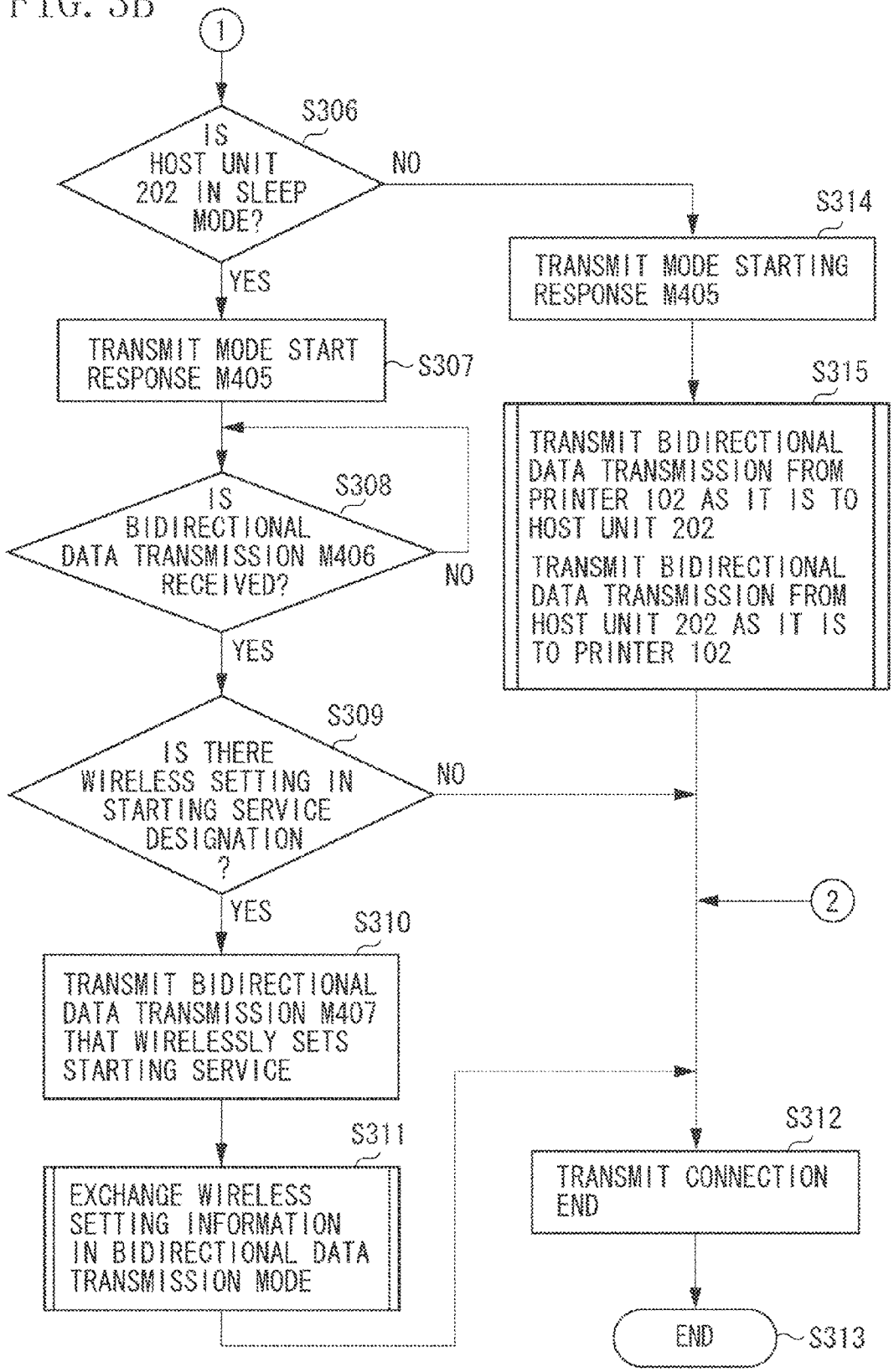

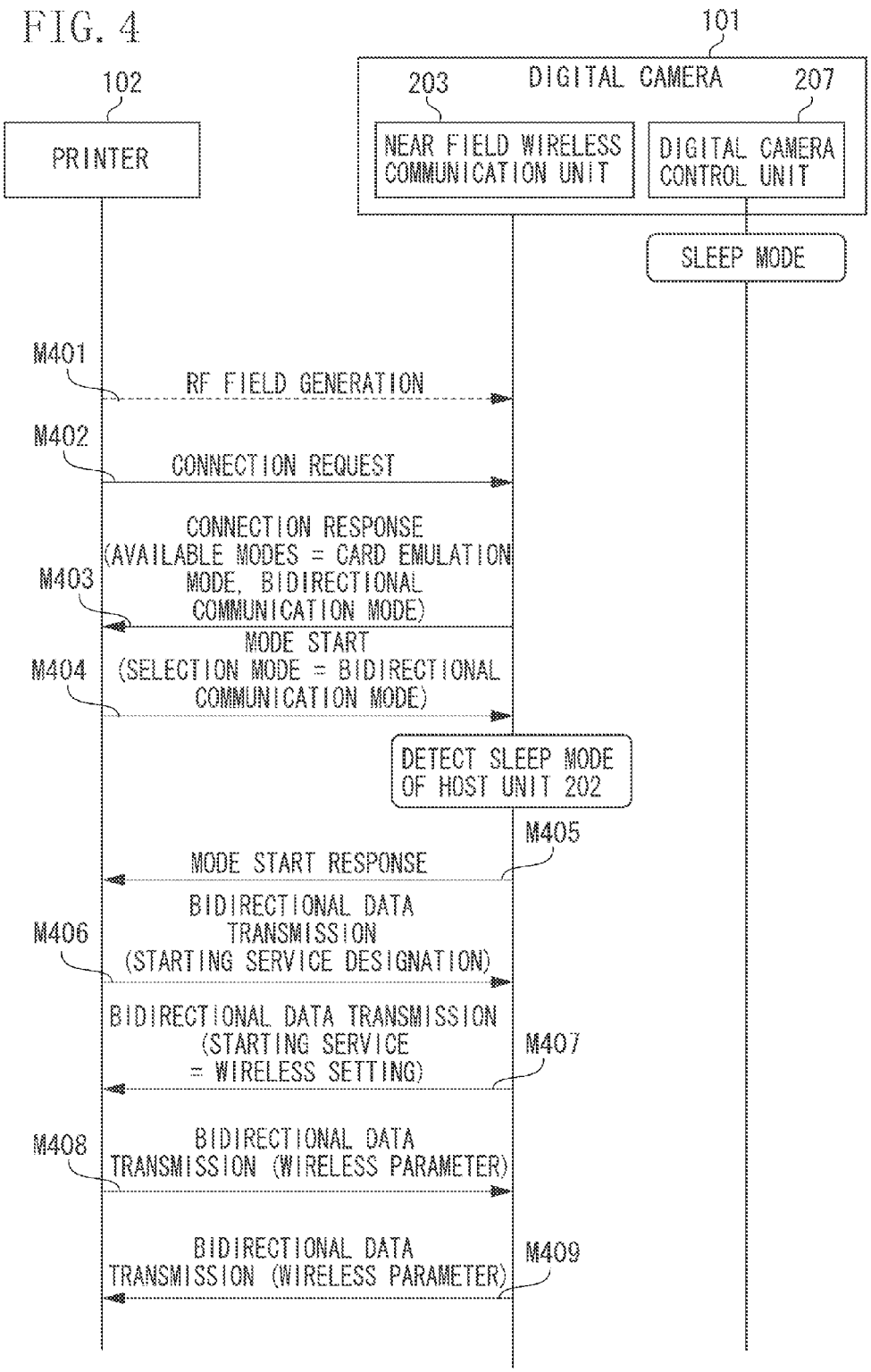

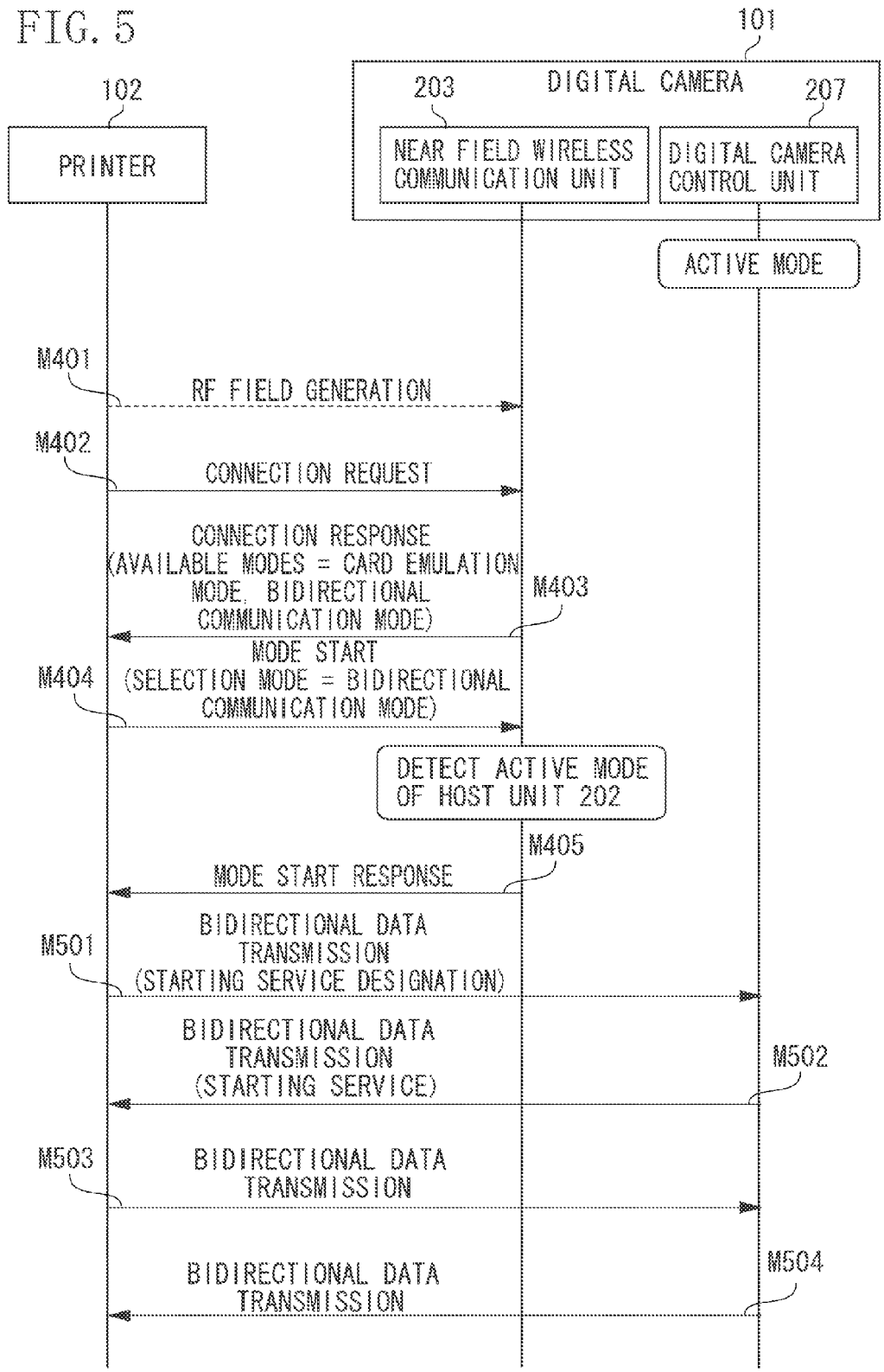

COMMUNICATION APPARATUS, CONTROL METHOD, AND PROGRAM

TECHNICAL FIELD

The present invention relates to a communication apparatus, a control method, and a program.

BACKGROUND ART

In recent years, near field wireless communication methods such as near field communication (NFC), infrared data association (IrDA), or TransferJet (registered trademark) have begun to be used. The standardization of the NFC is proceeding in NFC Forum and three modes including a bidirectional communication mode that performs bidirectional communication, a reader/writer mode that reads and writes an NFC tag, and a card emulation mode that operates as a NFC tag are defined.

As an application that uses the NFC bidirectional communication mode, a protocol for transmitting and receiving wireless parameter information, which is required to perform handover from the NFC to a different wireless communication mode such as a wireless fidelity (Wi-Fi), is standardized. By performing the handover using the NFC, it is possible to establish a high speed communication path such as Wi-Fi only by disposing two machines closely to each other and to transmit and receive a large quantity of data.

Further, even in European Telecommunications Standards Institute (ETSI), a standard of the NFC is defined. ETSI standardizes a host controller interface (HCI) for communicating between an NFC communication chip and a host unit including a universal integrated circuit control (UICC). By using the HCI, the NFC communication chip and the host unit can be separated into different integrated circuit (IC) chips.

With this, for example, in a case of using a file system of the NFC tag in the UICC, the UICC is activated only by using an induced electromotive force of the NFC to be operated as an NFC tag. However, since the electric energy which can be supplied with the induced electromotive force of the NFC is small, generally, the induced electromotive force is used to locally supply a power to the UICC, and the power needs to be supplied by using the internal power supply when the host unit of the machine is activated.

As an example to separate the communication chip and the host unit, a configuration may be considered in which the NFC tag is mounted in the UICC, and a protocol stack concerning is mounted in the bidirectional communication mode and the reader/writer mode is mounted in the host unit of the machine. In this configuration, when a communication is performed using one machine as a NFC tag and the other machine as the reader/writer, the one machine may operate not via the host unit.

In other words, a user can realize the function without turning on a main power source or manipulating the application. Further, when the bidirectional communication mode is used between the two machines, the communication is performed while operating the host unit to perform a service requested by the communication partner.

When the wireless setting information for a wireless LAN is provided or received between two machines, the NFC communication needs to be performed using the bidirectional communication mode. Further, when the processing that uses the bidirectional communication mode is performed, the NFC communication is performed in a state where the host unit is operated in both machines.

As described above, when the wireless setting information for a wireless LAN is provided or received between two machines, the NFC communication needs to be performed using the bidirectional communication mode. Further, when the processing that uses the bidirectional communication mode is performed, the NFC communication is performed in a state where the host unit is being operated in both machines regardless of the information transferred between the machines.

Therefore, even when the wireless setting information for a wireless LAN is to be provided or received, the host unit is operated regardless of the operations such as image capturing or image exchanging.

SUMMARY OF INVENTION

Technical Problem

When the host unit is in a low power consumption mode, that is, even when the main power source is turned off, the wireless setting information needs to be provided or received after turning on the main power source. Therefore, a machine which is turned off also consumes the power. Further, when a battery ran out, the host unit does not operate, so that the wireless setting information may not be provided nor received.

As described above, in the communication apparatus including a control unit and a communication unit, the communication using the bidirectional communication mode cannot be performed when the control unit is in a low power consumption mode or in an inactive mode in which the control unit is inoperative.

Solution to Problem

According to an aspect of the present invention, a communication apparatus includes a first communication unit configured to communicate in a bidirectional communication mode for performing bidirectional message communication with an apparatus at the other side and in another mode for accepting an access to a predetermined storage area from the apparatus at the other side, a control unit that has an active mode having a first power consumption and an inactive mode having a lower power consumption than the first power consumption, and a detection unit configured to detect that the control unit is in the inactive mode, wherein when the control unit is in the inactive mode, and the first communication unit performs the bidirectional communication mode with a communication partner, and a predetermined service is designated by the communication partner, the first communication unit communicates information according to the predetermined service designated by the communication partner while the control unit is in the inactive mode.

Advantageous Effects of Invention

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram of a digital camera according to an exemplary embodiment of the present invention.

FIG. 3A (a first part of a flowchart of FIG. 3) is a flowchart illustrating an operation of a near field wireless communication unit 203 of a digital camera 101 according to an exemplary embodiment of the present invention.

FIG. 3B (a second part of a flowchart of FIG. 3) is a flowchart illustrating the operation of the near field wireless communication unit 203 of the digital camera 101 according to the exemplary embodiment of the present invention.

FIG. 4 is a message chart between the digital camera 101 and a printer 102 when a host unit 202 of the digital camera 101 according to the exemplary embodiment of the present invention is in a SLEEP mode.

FIG. 5 is a message chart between the digital camera 101 and the printer 102 when the host unit 202 of the digital camera 101 according to the exemplary embodiment of the present invention is in an ACTIVE mode.

DESCRIPTION OF EMBODIMENTS

Figure 1:
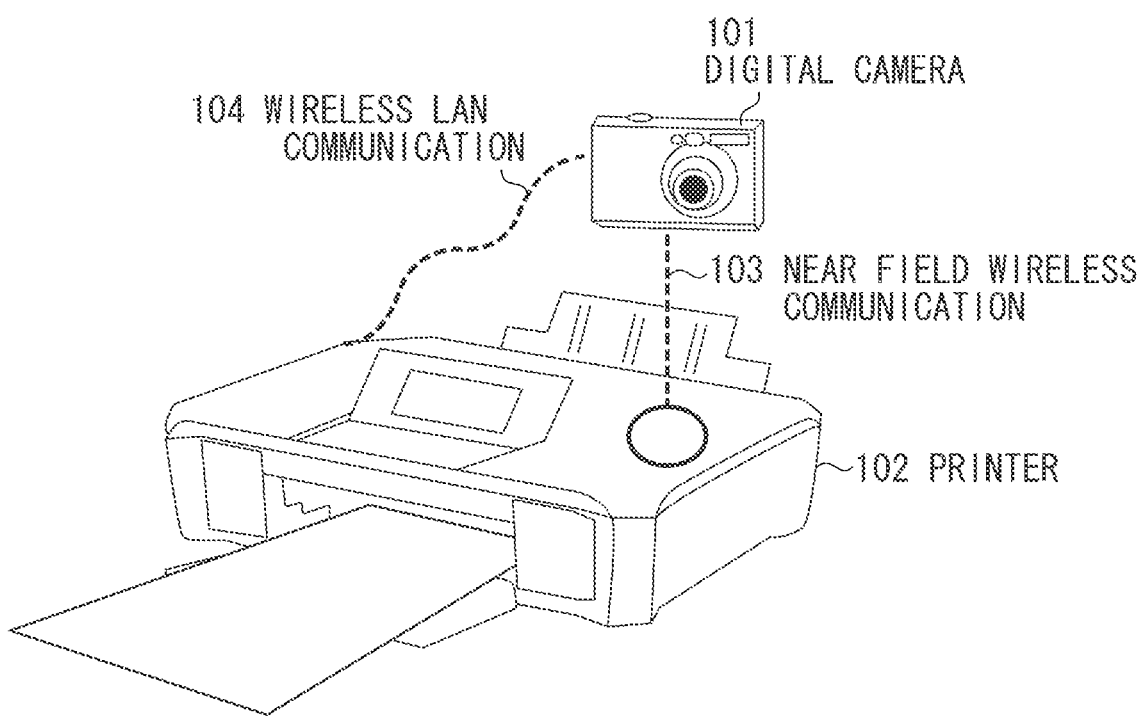
FIG. 1 is a system configuration diagram according to an exemplary embodiment of the present invention.

The accompanying drawings, which are incorporated in and constitute a part of the specification, illustrate exemplary embodiments, features, and aspects of the invention and, together with the description, serve to explain the principles of the invention.

Example 1

FIG. 1 is a system configuration diagram of an exemplary embodiment. When a digital camera 101 and a printer 102 are moved close to each other, data communication can be performed via a near field wireless communication 103.

The near field wireless communication 103 includes non-contact IC card wireless communication that uses the electromagnetic induction or communication that uses near field communication (NFC) or an induced electric field. A maximum communication speed thereof is several hundreds of kbps and a communicatable range is within several centimeters. In the present exemplary embodiment, as an example of the near field wireless communication 103, an NFC standard which is standardized in NFC Forum will be described.

The communication mode defines a function for establishing a logical communication path with a machine at the other end which is physically connected thereto. In the NFC standard, a reader/writer mode, a card emulation mode, and a bidirectional communication mode are defined.

The reader/writer mode is a mode in which a memory access from a reader/writer is accepted, and a memory area that is retained by a NFC tag is read and written. The card emulation mode is a mode in which the NFC tag is emulated to accept the memory access from the reader/writer. The bidirectional communication mode is a mode in which message communication with the machine at the other side is performed bidirectionally and a data packet is communicated bidirectionally with a communication partner. In the bidirectional communication mode, both machines need to operate in the bidirectional communication mode.

In the NFC Forum, an NFC connection handover for the handover to a communication method other than the NFC such as Bluetooth (registered trademark) or Wi-Fi is standardized. In the NFC handover, a dynamic handover method that uses the bidirectional communication mode and a static handover method that uses a reader/writer mode are defined.

The dynamic handover method generates information required for the handover from the both machines at a predetermined timing to provide the information from one machine to the other machine or exchange the information. On the other hand, the static handover method only allows the reader/writer side to read fixed information stored in the NFC tag, and thus the function thereof is limited as compared with the dynamic handover method. Even when a method other than the NFC standard is used for the near field wireless communication 103, the communication mode or method similar to the above-mentioned communication mode or method can be used.

A wireless LAN communication 104 is communication in a communication mode such as Wi-Fi of IEEE 802.11 wireless LAN, Bluetooth (registered trademark), wireless USB, or WiGig, and different from the near field wireless communication 103. In the present exemplary embodiment, as an example of the wireless LAN communication 104, Wi-Fi will be described.

The wireless LAN communication 104 can directly communicate wirelessly between the digital camera 101 and the printer 102 or wirelessly communicate through a relay apparatus such as a wireless LAN access point. When the communication starts by the wireless LAN communication 104, wireless parameters including information such as an encryption method, an encryption key, an authentication method, and an authentication key are set in the apparatus to perform the communication by performing the encryption or authentication.

Specifically, Wi-Fi protected access (WPA) which is standardized in the Wi-Fi alliance is an example of the encryption or authentication. Further, the encryption or authentication may be performed by other methods.

In the Wi-Fi alliance, a method for simplifying the setting of the wireless parameters is also standardized and a standard of Wi-Fi protected setup (WPS) or Wi-Fi Direct is present. In the above-mentioned standard, an out-of band interface (OOB) method that sets a wireless parameter in the apparatus using a communication path such as the NFC other than the wireless LAN is defined.

In the OOB method, a method for setting a network identifier of the near field wireless communication 103 and various wireless parameters of the wireless LAN communication 104 using the NFC connection handover standardized in the NFC is defined.

FIG. 2 is a block diagram illustrating a configuration of the digital camera 101. A chip unit 201 functions as a communication unit that controls the near field wireless communication 103 to be performed. A host unit 202 functions as a control unit that controls the digital camera 101 to capture an image. The digital camera 101 includes the chip unit 201 and the host unit 202, and separately can control individual power supplies and define an operation mode of the CPU.

In the present exemplary embodiment, the host unit 202 has two CPU operation modes including a SLEEP mode and an ACTIVE mode. The SLEEP mode is a state where the power supply is turned off for the user and the image capturing operation cannot be performed.

When the user turns on a power switch, the SLEEP mode is shifted to the ACTIVE mode state. In contrast, when the user turns off the power switch, the ACTIVE mode is shifted to the SLEEP mode. The chip unit 201 can operate even in the SLEEP mode, and perform the near field wireless communication 103.

The SLEEP mode is a low power consumption mode whose power consumption is smaller than that of the ACTIVE mode. The ACTIVE mode is an active mode when the host unit 202 operates. The SLEEP mode is an inactive mode when the host unit 202 is in a low power consumption state.

A near field wireless communication unit 203 controls the near field wireless communication 103. A host operation mode detection unit 204 detects the operation mode of the host unit 202. The host operation mode detection unit 204 detects whether the host unit 202 is in the ACTIVE mode or the SLEEP mode.

Further, even when the battery of the digital camera 101 ran out and the host unit 202 does not operate, the host operation mode detection unit 204 detects that the host unit 202 is in the SLEEP mode. A case where the host unit 202 does not operate is also an inactive mode.

The chip unit 201 includes a memory 205 and a storage area 206 that stores various wireless information. In the area 206, wireless parameters exchanged through the near field wireless communication 103 and used in the wireless LAN communication unit 211 are stored.

A digital camera control unit 207 controls entire digital camera 101. An operation mode control unit 208 controls the operation mode such as the SLEEP mode and the ACTIVE mode of the host unit 202. An image capturing unit 209 performs a capturing operation. A storage unit 210 is also provided in the host unit 202. A wireless LAN communication unit 211 controls the wireless LAN communication 104.

FIG. 3 (including FIGS. 3A and 3B) is a flowchart illustrating an operation of the near field wireless communication unit 203 of the digital camera 101.

FIG. 4 is a message chart between the digital camera 101 and the printer 102 when the host unit 202 of the digital camera 101 is in the SLEEP mode.

FIG. 5 is a message chart between the digital camera 101 and the printer 102 when the host unit 202 of the digital camera 101 is in the ACTIVE mode.

A user of the digital camera 101 brings the digital camera 101 close to the printer 102 to exchange some information with the printer 102. Here, when the power of the digital camera 101 is turned off, that is, the host unit 202 is in the SLEEP state, if the digital camera 101 is brought close to the printer 102, it is considered that the user intends to set a wireless parameter for the wireless LAN communication 104 between the digital camera 101 and the printer 102.

The wireless parameter for the wireless LAN communication 104 is a communication parameter that is required to perform the wireless communication of the wireless LAN communication 104 such as an SSID, an encryption method, an encryption key, an authentication method, and an authentication key as a network identifier.

Further, when the power of the digital camera is turned on, that is, the host unit 202 is in the ACTIVE state, if the digital camera 101 is brought close to the printer 102, it is considered that the user intends to transmit an image from the digital camera 101 to the printer 102.

The printer 102 generates a RF field (electromagnetic field) M401 to perform the near field wireless communication 103. The printer 102 regularly transmits "connection request M402".

When the digital camera 101 is brought close to the printer 102, the "connection request M402" transmitted from the printer 102 is received by the digital camera 101. In step S303, the near field wireless communication unit 203 that receives the "connection request M402" (Yes in step S302) transmits a "connection response M403" that has "a card emulation mode" and "a bidirectional communication mode" as "an available mode" to the printer 102.

The printer 102 that receives the "connection response M403" selects a communication mode that is intended to be performed by the printer 102 from the "available modes" included in the message and notifies the selected communication mode to the digital camera 101 in a "mode start M404".

When an access to the memory 205 of the digital camera 101 is performed, the "card emulation mode" is selected. On the other hand, when image data is transmitted/received, the "bidirectional communication mode" is designated. Even when the wireless parameter is provided or received, the "bidirectional communication mode" is designated. Which mode will be selected is determined according to the setting state of the printer 102 and the user's instruction.

In step S304, the near field wireless communication unit 203 that receives the "mode start M404" changes the processing according to the "selected mode" included in the message. When the "selected mode" is the "card emulation mode" (Yes in step S316), a "mode start response M405" is transmitted to the printer 102 and then in step S318, the communication is performed with the printer 102 in the card emulation mode. With this operation, the printer 102 may read or write the memory 205 of the digital camera 101.

In step S305, when the "selected mode" is a "bidirectional communication mode", the operation mode of the host unit 202 is detected by the host operation mode detection unit 204 to perform the following processing.

When the operation mode of the host unit 202 detected by the host operation mode detection unit 204 is the SLEEP mode (Yes in step S306), in step S307, the digital camera 101 transmits the "mode start response M405" to the printer 102.

The printer 102 that receives the "mode start response M405" transmits to the digital camera 101 a "bidirectional data transmission M406" in which a starting service is designated. When the printer 102 transmits/receives the image data, "image transmission" is designated in the "starting service". When the printer 102 sets the wireless parameter, the "wireless setting" is designated in the "starting service".

In step S308, the near field wireless communication unit 203 receives the "bidirectional data transmission M406", and analyzes the "starting service" included in the message in step S309. When the setting is not the "wireless setting" (No in step S309), in step S312, the near field wireless communication unit 203 transmits connection end to end the communication.

When the setting is the "wireless setting" (Yes in step S309), in step S310, the near field wireless communication unit 203 transmits a "bidirectional data transmission M407" in which the "starting service" is set to the "wireless setting" to the printer 102. Thereafter, in step S311, the near field wireless communication unit 203 transmits/receives the "bidirectional data transmission M408 and M409" to/from the printer 102 to set the wireless parameter.

Therefore, information on the wireless parameter which is stored or generated in the printer 102 may be transmitted to the digital camera 101 or the information on the wireless parameter which is stored in the digital camera 101 may be transmitted to the printer 102.

As an example, when the wireless parameter has been already stored in the wireless information storage area 206 of the digital camera 101, the wireless parameter is transmitted from the digital camera 101 to the printer 102. In this case, the near field wireless communication unit 203 transmits the wireless parameter which is stored in the wireless information storage area 206 to the printer 102 in the "bidirectional data transmission M409".

When the wireless parameter is not stored in the wireless information storage area 206 of the digital camera 101, the wireless parameter is transmitted from the printer 102 to the digital camera 101. In this case, when the near field wireless communication unit 203 receives the "bidirectional data transmission M408", the near field wireless communication unit 203 stores the wireless parameter contained in a message in the wireless information storage area 206.

On the other hand, in step S306, if the near field wireless communication unit 203 receives the "mode start M404" in which the "selection mode" is the "bidirectional communication mode", when the host operation mode is the ACTIVE mode, in step S314, the near field wireless communication unit 203 transmits the "mode start response M405" to the printer 102.

Thereafter, "bidirectional data transmission messages M501, M502, M503, and M504" are transmitted/received as it is between the printer 102 and the digital camera control unit 207 via the near field wireless communication unit 203.

In other words, the bidirectional data transmission from the printer 102 is transmitted to the host unit 202 as it is and the bidirectional data transmission from the host unit 202 is transmitted to the printer 102 as it is. The digital camera control unit 207 of the host unit 202 confirms the "starting service" contained in the "bidirectional data transmission M501" message received from the printer 102.

When the "starting service" is "image transmission", the digital camera control unit 207 transmits the "bidirectional data transmission M502" in which "starting service" is "image transmission" to the printer 102. Thereafter, the digital camera control unit 207 transmits/receives the "bidirectional data transmission M503 and M504" to/from the printer 102 to transmit the image data stored in the storage unit 210 to the printer 102.

Here, an image designated by the printer 102 may be transmitted in the "bidirectional data transmission M503" or an image designated by the operation of the user of the digital camera may be transmitted to the printer 102.

As described above, according to the present exemplary embodiment, even though the host unit 202 is in the SLEEP mode, the wireless parameter may be set by the near field wireless communication 103. Further, even when the battery is ran out so that the host unit 202 does not operate, the wireless parameter may be set via the near field wireless communication 103.

Further, in the present exemplary embodiment, when the host unit 202 is in the SLEEP mode, only the wireless parameter is provided or received in the bidirectional communication mode, but other specific information may be transmitted or received. For example, the camera setting information may be transmitted or received. In this case, when a PC or a smart phone has camera setting information, if the camera is brought close to the PC or the smart phone, even though the host unit of the camera is in a SLEEP mode, the camera setting information may be transmitted/received through the bidirectional communication mode of the near field wireless communication unit 203.

Example 2

In a second exemplary embodiment, after receiving the wireless parameter of the first exemplary embodiment from the printer 102, the transmitted or received wireless parameter is notified to the host unit 202.

It is assumed that if the host unit 202 is in the SLEEP mode, as described in the first exemplary embodiment, the wireless parameter is transmitted or received. The host operation mode detection unit 204 monitors whether the host unit 202 is shifted to the ACTIVE mode.

Thereafter, the host unit 202 enters the ACTIVE mode by the operation of the user or by connecting the digital camera 101 and the PC through a USB cable. When the host unit 202 is in the ACTIVE mode, the near field wireless communication unit 203 notifies the wireless parameter stored in the wireless information storage area 206 to the host unit 202.

The digital camera control unit 207 sets the wireless parameter notified from the near field wireless communication unit 203 in the wireless LAN communication unit 211.

Alternatively, when the host unit 202 is in the ACTIVE mode, the digital camera control unit 207 checks contents stored in the wireless information storage area 206. As a result of the check, when the wireless parameter is stored in the wireless information storage area 206, the digital camera control unit 207 sets the wireless parameter in the wireless LAN communication unit 211.

According to the second exemplary embodiment, when the power is supplied to the host unit 202 and the host unit 202 is shifted to the ACTIVE mode, the wireless parameter information which is transmitted or received while the host unit 202 is in the SLEEP mode is automatically set in the wireless LAN communication unit 211. Therefore, the wireless LAN communication may be performed using the wireless LAN communication unit 211.

In the first and second exemplary embodiments, the digital camera and the printer have been described as an example. However, if an apparatus includes the near field wireless communication 103 and the wireless LAN communication 104, the present invention may be applied to another types of apparatuses.

For example, instead of the digital camera, the exemplary embodiments can be used for various apparatuses such as a mobile phone, a personal computer, a printer, a wireless LAN access point (wireless LAN router), a speaker, or an earphone. Further, instead of the printer, the exemplary embodiments may be used for various apparatuses such as a mobile phone, a personal computer, a printer, a wireless LAN access point (wireless LAN router), a speaker, or an earphone.

As described above, according to the exemplary embodiments of the present invention, even though the host unit is in a low power consumption mode or an inactive mode where the host unit does not operate, predetermined information such as wireless setting information may be transmitted or received using the bidirectional communication mode.

Further, when the host unit is in an active state, information other than the predetermined information can also be transmitted or received. When the host unit is in an active mode to be in an operation state, the information which is transmitted or received while the host unit is in the low power consumption mode or in an inoperative state is set to be used by the host unit which is in the active state, or the other communication unit.

The present invention may be embodied by the following processing. Specifically, software (program) that implements the function of the above-described exemplary embodiments is supplied to a system or an apparatus through a network or various storage media and a computer (or a CPU or MPU) of the system or the apparatus reads out and executes the program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application is a national phase application of international application PCT/JP2013/000198, filed on Jan. 17, 2013, which is hereby incorporated by reference herein in its entirety, and this application claims priority from Japanese Patent Application No. 2012-015601, filed Jan. 27, 2012, which is hereby incorporated by reference herein in its entirety.

The invention claimed is:

1. A communication apparatus, comprising:
a first communicator configured to communicate in a bidirectional communication mode for performing bidirectional message communication with an apparatus;
a controller that has an active mode having a first power consumption and an inactive mode having a lower power consumption than the first power consumption; and
an operation mode detector configured to detect that the controller is in the inactive mode,
wherein when the controller is in the inactive mode and a predetermined service is designated by a communication partner, the first communicator communicates information according to the predetermined service designated by the communication partner while the controller is in the inactive mode, and
wherein when the controller is in the inactive mode, and a service other than the predetermined service is designated by the communication partner, the first communicator does not perform communication according to the designated service.

2. The communication apparatus according to claim 1, further comprising:
a second communicator that is different from the first communicator,
wherein when a communication parameter setting for communication of the second communicator is designated as the predetermined service, the first communicator communicates the communication parameter while the controller is in the inactive mode.

3. The communication apparatus according to claim 1, wherein the first communicator is configured to communicate in another mode for accepting an access to a predetermined storage area from an apparatus, and the first communicator performs communication in the another mode with the communication partner regardless of whether the controller is in the active mode or in the inactive mode.

4. The communication apparatus according to claim 1, wherein when the first communicator performs the bidirectional communication mode with the communication partner while the controller is in the inactive mode, and the predetermined service is designated by the communication partner, the first communicator transmits information stored in a predetermined storage area or writes the information received from the communication partner in the predetermined storage area.

5. The communication apparatus according to claim 1, wherein after communicating information according to the predetermined service while the controller is in the inactive mode, when it is detected that the controller is shifted to the active mode, the first communicator notifies the communicated information to the controller.

6. The communication apparatus according to claim 1, wherein when the controller is shifted to the active mode after communicating information according to the predetermined service while the controller is in the inactive mode, the controller confirms information stored in a predetermined storage area.

7. A control method for a communication apparatus including a first communicator configured to communicate in a bidirectional communication mode for performing bidirectional message communication with an apparatus, and a controller that has an active mode having a first power consumption and an inactive mode having a lower power consumption than the first power consumption, the method comprising:
when the controller is in the inactive mode and a predetermined service is designated by a communication partner, communicating, by the first communicator, information according to the predetermined service designated by the communication partner while the controller is in the inactive mode, and
when the controller is in the inactive mode, and a service other than the predetermined service is designated by the communication partner, not communicating, by the first communicator, according to the designated service.

8. A non-transitory computer-readable storage medium storing a computer-executable program for causing a computer to perform a control method for a communication apparatus including a first communicator configured to communicate in a bidirectional communication mode for performing bidirectional message communication with an apparatus, and a controller that has an active mode having a first power consumption and an inactive mode having a lower power consumption than the first power consumption, the method comprising:
when the controller is in the inactive mode and a predetermined service is designated by a communication partner, communicating, by the first communicator, information according to the predetermined service designated by the communication partner while the controller is in the inactive mode, and
when the controller is in the inactive mode, and a service other than the predetermined service is designated by the communication partner, not communicating, by the first communicator according to the designated service.

9. A communication apparatus, comprising:
a first communicator configured to communicate in a bidirectional communication mode for performing bidirectional message communication with an apparatus;
a second communicator; and
a controller capable of shifting between an active state having a first power consumption and an inactive state having a lower power consumption than the first power consumption,
wherein when the bidirectional communication mode and a communication of communication setting information of the second communicator are designated by a communication partner while the controller is in the inactive state, the first communicator communicates the communication setting information while the controller is kept in the inactive state, and when the bidirectional communication mode is designated by the communication partner while the controller is in the active state, the first communicator transmits the information from the communication partner to the controller.

10. A communication apparatus, comprising:

a first communicator configured to communicate in a bidirectional communication mode for performing bidirectional message communication with an apparatus;

a second communicator; and a controller capable of shifting between an active state having a first power consumption and an inactive state having a lower power consumption than the first power consumption, wherein when the bidirectional communication mode and a communication of communication setting information of the second communicator are designated by a communication partner while the controller is in the inactive state, the first communicator communicates the communication setting information while the controller is kept in the inactive state, and when the bidirectional communication mode is designated and the communication of communication setting information of the second communicator is not designated by the communication partner while the controller is in the inactive state, the first communicator terminates the connection with the communication partner.

11. A communication apparatus comprising:

a communicator configured to perform bidirectional communication for bidirectional message communication with another apparatus by near field wireless communication;

a first controller configured to control a mode of the communication apparatus including a first mode and a second mode in which power consumption is lower than in the first mode;

a second controller configured to cause the communicator to perform communication for executing a first service along with processing in the first mode of the communication apparatus in a case where the communication apparatus is requested to perform the first service when the communication apparatus is in the first mode;

a restrictor configured to restrict the communication for executing the first service by the communicator in a case where the communication apparatus is requested to perform the first service when the communication apparatus is in the second mode; and a third controller configured to cause the communicator to perform communication for executing a second service different from the first service without the processing in the first mode of the communication apparatus while the communication apparatus is in the second mode in a case where the communication apparatus is requested to perform the second service when the communication apparatus is in the second mode.

12. The communication apparatus according to claim 11, wherein the second service is a service for handover from a first communication method used for communication by the communicator to a second communication method different from the first communication method.

13. The communication apparatus according to claim 11, wherein the communicator is configured to perform communication based on Near Field Communication (NFC) standards.

14. The communication apparatus according to claim 11, wherein the first service is a service for transferring an image.

* * * * *